United States Patent
Chaudhari et al.

(10) Patent No.: US 7,143,219 B1
(45) Date of Patent: Nov. 28, 2006

(54) MULTILEVEL FAIR PRIORITY ROUND ROBIN ARBITER

(75) Inventors: Sunil C. Chaudhari, Milpitas, CA (US); Jonathan W. Liu, Campbell, CA (US); Manan Patel, San Jose, CA (US); Nicholas E. Duresky, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 330 days.

(21) Appl. No.: 10/335,577

(22) Filed: Dec. 31, 2002

(51) Int. Cl.
*G06F 13/00* (2006.01)

(52) U.S. Cl. ............... 710/111; 710/117; 710/121; 710/243

(58) Field of Classification Search ............ 710/111, 710/117, 121, 243
See application file for complete search history.

(56) References Cited

U.S. PATENT DOCUMENTS

| | | | |
|---|---|---|---|
| 4,760,515 A * | 7/1988 | Malmquist et al. | 710/121 |
| 4,814,974 A * | 3/1989 | Narayanan et al. | 710/244 |
| 4,924,380 A * | 5/1990 | McKinney et al. | 710/111 |
| 5,088,024 A * | 2/1992 | Vernon et al. | 710/111 |
| 5,146,596 A * | 9/1992 | Whittaker et al. | 710/116 |
| 5,203,007 A * | 4/1993 | Gallagher | 710/41 |
| 5,241,632 A * | 8/1993 | O'Connell et al. | 710/117 |
| 5,303,382 A * | 4/1994 | Buch et al. | 710/244 |
| 5,583,999 A * | 12/1996 | Sato et al. | 710/100 |
| 5,729,702 A * | 3/1998 | Creedon et al. | 710/111 |
| 5,832,278 A * | 11/1998 | Pham | 710/243 |
| 6,073,132 A * | 6/2000 | Gehman | 707/9 |
| 6,467,002 B1 * | 10/2002 | Yang | 710/116 |
| 6,665,760 B1 * | 12/2003 | Dotson | 710/240 |
| 6,895,459 B1 * | 5/2005 | Hadwiger et al. | 710/111 |
| 6,976,109 B1 * | 12/2005 | Shenderovich | 710/243 |

\* cited by examiner

*Primary Examiner*—Glenn A. Auve
*Assistant Examiner*—Justin King
(74) *Attorney, Agent, or Firm*—Alan L. Pedersen-Giles

(57) ABSTRACT

A method and apparatus for controlling access to a plurality of resources based on multiple received requests is provided. The system includes a priority register configured to receive each individual request, determine a priority for the request, and transmit the request to a priority appropriate path. A first high priority arbiter receives and arbitrates among highest priority requests in a round robin manner to determine a high priority suggested grant vector. At least one lower priority arbiter receiving and arbitrating among lower priority requests in a round robin manner to determine at least one lower priority suggested grant vector. Grant circuitry passes the high priority suggested grant vector unless said grant circuitry receives a low priority indication, whereby the grant circuitry passes a lower priority grant vector.

20 Claims, 5 Drawing Sheets

MULTILEVEL FAIR PRIORITY ROUND ROBIN ARBITER

BACKGROUND OF THE INVENTION

1. Field of the Invention

The present invention relates generally to the field of arbitration, and more specifically to methods and apparatus for arbitrating requester access requests for access to multiple resources or channels in a high speed data transmission environment.

2. Description of the Related Art

Data communication networks receive and transmit ever increasing amounts of data. Data is transmitted from an originating entity or requester, through the network to a destination, such as a channel or resource. Along this path may be multiple points that receive data, typically in the form of packets or data frames, and along each point data must be routed to the next point in the network in a rapid and efficient manner. Certain protocols or standards may be employed in transferring data from one point to another, and such standards enable hardware and software employing different configurations to effectively receive and transfer the data. Such standards include, but are not limited to, Utopia, X.25, and other standards promulgated by the ITU and ANSI.

The points throughout the data network operate to receive data requests or packets from various requesters and provide results or satisfy requests in an orderly and efficient manner. Requests may arrive synchronously or asynchronously, and requests may be for access to multiple resources or channels or to particular sets of resources or channels. For example, multiple requesters may transmit data seeking access multiple times each second to channel one, while a single requestor may transmit data on an approximate hourly basis requesting access to channel two. A single requester may request access to multiple resources at one time. The hardware or software at the data transmission point in the data network acts as a traffic officer, deciding which data packets receive priority in transmission while requiring others to wait.

The traditional hardware or software used to perform this access control function has been a form of arbiter, typically a round robin arbiter. Other designs have been employed, including lookup tables, FIFO arrangements, and other designs known to those skilled in the art. A round robin arbiter receives requests from requesters and allocates those requests among the channels or resources sequentially according to requester position. For example, if requestors one through five seek access to a Channel A, and requesters one through four transmit multiple requests while requester five transmits one request, the round robin arbiter allows access in an ordered manner to requestors one through five and subsequently to one through four until all requests have been satisfied. If requester five has not made a request, the round robin arbiter skips requester five and goes on to the next requestor in sequence. If requester five adds a request at some point during arbitration, this new request becomes part of the round robin process and is satisfied sequentially. This differs from a FIFO arrangement in that input channels are individually queued in round robin arbitration, while FIFO employs a single queue, and the first request received is the first request satisfied.

The problems with the round robin arrangement include the inability to prioritize the arriving requests in an efficient manner and the difficulty accounting for priorities among the requests. It is desirable for certain requests or certain requesters to receive higher priority than others. Round robin arbitration simply goes through the requests from the requestors in order and allows them access to the resource when it is the requestor's "turn." In the foregoing example, if requestor one is a high priority requestor generating a large number of requests in a short amount of time while requester five is a lower priority, the round robin arbitration will grant the request from requester five in round robin fashion every time the requester five queue includes a request. This granting of a slot to low priority requestor five will hinder system performance by slowing the higher priority requester one requests. The result is delays to priority requests and lower throughput at the data transfer point.

Round robin arbiters are simple, straightforward, and relatively well known. To the extent a simple, straightforward and relatively well known design could be employed in a weighted arbitration scheme, such a design would be beneficial.

Based on the foregoing, it would be desirable to provide a system that overcomes the limitations associated with round robin arbiters with respect to priorities associated with incoming requests.

DESCRIPTION OF THE DRAWINGS

The present invention is illustrated by way of example, and not by way of limitation, in the figures of the accompanying drawings in which.

DETAILED DESCRIPTION OF THE INVENTION

Figure 1:
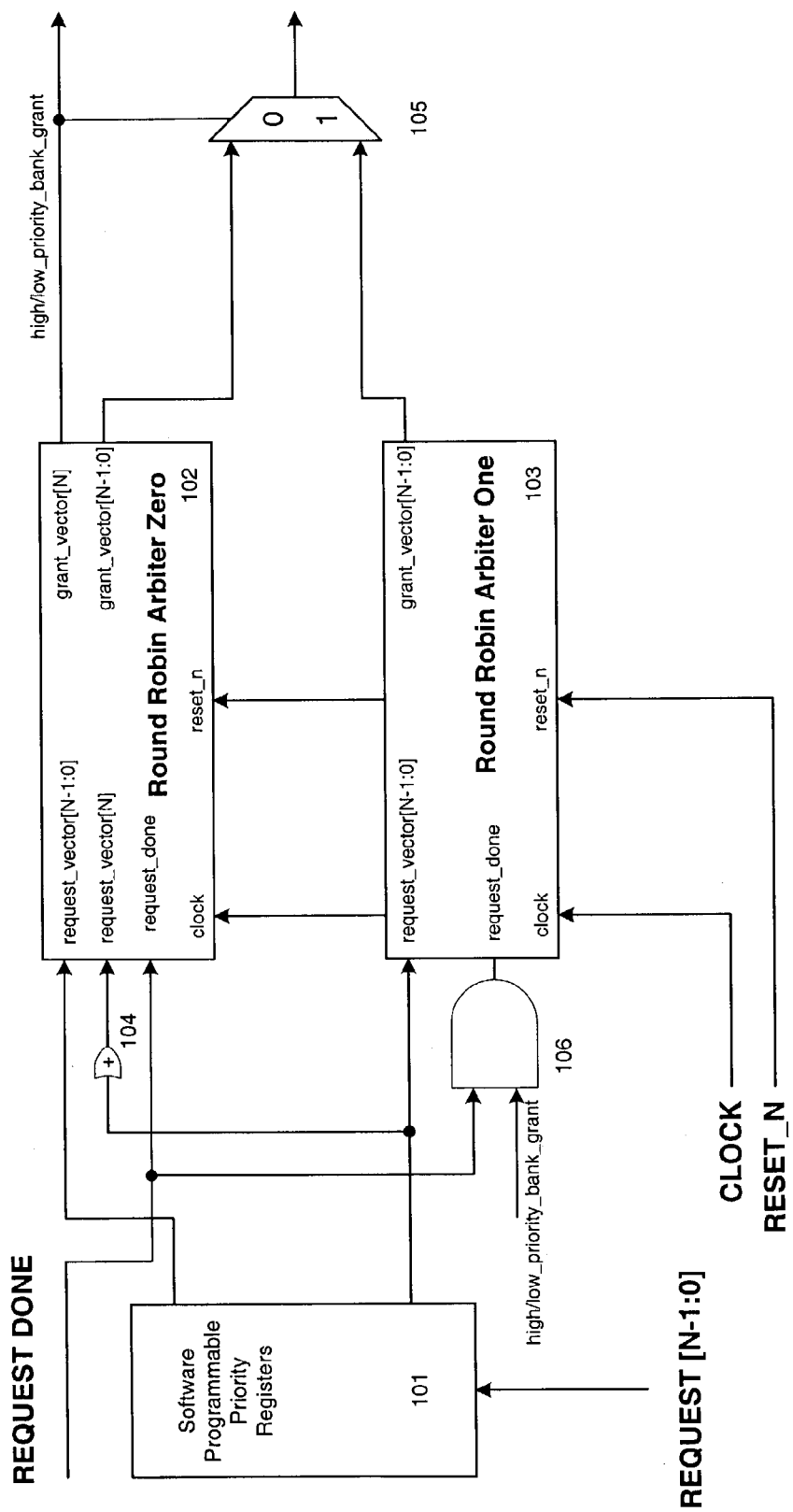
FIG. 1 is a cascaded round robin arbitration design employing two arbiters and allowing two levels of priority.

The present design is a cascaded round robin arbitration scheme as shown in FIG. 1. From FIG. 1, the system receives requests via software programmable priority registers 101. Requests may be received from N channels, numbered 0 through N−1. Priority registers operate to determine the priority for each request received. Thus for each request a minimum of three associated types of information may be available within the software programmable priority registers, namely the request contents, the requesting entity or requester, and the priority associated with the request.

FIG. 1 illustrates two levels of arbitration, one performed at round robin arbiter zero 102 and the second at round robin arbiter one 103. As discussed below, additional levels of arbitration may be provided, but for the design of FIG. 1, priority levels may be "high" (priority zero) or "low" (priority one) for the requests received. High priority requests as determined by the software programmable priority registers 101 pass to round robin arbiter zero 102. Round robin arbiter zero 102 is an N+1 dimensioned arbiter configured to receive requests from software programmable priority registers 101. Round robin arbiter zero 102 cycles through the N requesters or request channels as well as cycling through one channel corresponding to any slots allocated to round robin arbiter one 103. Round robin arbiter one 103 is an N dimensioned arbiter configured to receive requests from the software programmable priority registers 101. Thus for N+1 input channels seen by round robin arbiter zero 102, N request vectors are allocated to high priority requests sent to round robin arbiter zero 102, while one request is allocated to any low priority requests sent to round robin arbiter one 103. Other implementations of slot allocation can be employed and either set for all conditions or dynamically alterable based on desired performance.

Priority associated with each request may generally be determined in three ways, but other priority determination schemes may be employed. In the first instance, priority may be provided with the request such that the software programmable priority registers 101 simply associate the priority with the request and pass the request to the appropriate location, namely the arbiter associated with the level of priority. In the second instance, priority may be determined based on the requester or requesting entity such that in, for example, a three priority level arrangement one group of requesters is accorded high priority, a second group of requestors lower priority, and a third group of requesters lowest priority. In the third instance, a predetermined prioritizing scheme is employed, such as under certain conditions (load, timing, etc.), one set of requests is allocated highest priority, while under another set of conditions a different set of requests is allocated highest priority, and so on. Again, high priority requests are passed to one arbiter, the next lower priority requests pass to a second arbiter, and so on.

Round robin arbiter zero 102 is an N+1 channel round robin arbiter that operates as follows. High priority data is received from the software programmable priority registers 101 as request vectors 0 through N−1. Low priority data is received at round robin arbiter zero 102 in the form of a single low priority request vector. N input OR gate 104 receives the N low priority vectors and performs an OR function on all bits of the vectors, transmitting the output of the OR gate as the most significant bit of the request vector received by round robin arbiter zero 102. In the event no data is contained in the low priority queue, a zero is received by round robin arbiter zero 102 and no grant of a low priority vector occurs. Round robin arbiter zero 102 grants and outputs only one grant vector at a time in round robin fashion. For example, if high priority channels are 0 through 9, all data received from these ten channels is stored in the arbiter 102 and held until each request represented in the vector is granted. If the arbiter determines that channel 0 is the next channel in sequence, the request from channel 0 is granted and the resulting grant signal passes to multiplexor 105.

In the circumstance where the single low priority channel of the present configuration is the next in sequence in round robin arbiter zero 102, grant vector N passes as a control bit to the multiplexor 105. In the event this bit is received, the multiplexor 105 passes the grant vector from round robin arbiter one 103 and does not permit passage of the grant vector from round robin arbiter zero 102 through the multiplexor 105. Thus in the implementation shown, the round robin arbiter cycles through the N high priority channels and then allows passage of one low priority request from the low priority channels.

Round robin arbiter one 103 receives all low priority requests from software programmable priority registers 101. The number of channels N is one less than the number of channels N+1 for round robin arbiter zero 102. In this configuration, the software programmable priority registers 101 receive requests from N channels and a priority is associated with each request. Thus a request accorded high priority received from channel one is transmitted to round robin arbiter zero 102, while a different request received from channel one that is assigned a low priority is transmitted to round robin arbiter one 103. Alternate implementations, such as wherein each channel is allocated a high or low priority, may also be employed. On receiving the request from a channel, the request is transmitted from software programmable priority registers 101, stored in round robin arbiter one 103, and a suggested grant vector determined based on the received requests in the vector. This suggested grant vector is also referred to as a candidate vector.

If the round robin arbiter zero 102 determines that the slot dedicated to the low priority request is next in line, it so signals multiplexor 105 and the low priority grant vector is the grant vector transmitted by the multiplexor 105. If the round robin arbiter zero 102 does not signal to the multiplexor 105 that a low priority request is allowed, round robin arbiter one may not release the low priority grant vector and either may rearbitrate or may not rearbitrate depending on the design employed. In the implementation of FIG. 1, no rearbitration is employed in the event the low level priority grant vector is not selected by multiplexor 105. Thus the grant vector stays the same until the time a rearbitration occurs.

An alternate implementation is transmission from round robin arbiter zero 102 of a high priority signal to the multiplexor 105, indicating a high priority grant is warranted. The absence of the signal is an indication that a low priority grant is warranted. Either implementation can be employed, as long as an arbiter indicates to multiplexor 105 which signal should be passed or not passed in a particular situation.

The lack of rearbitration by round robin arbiter one 103 indicates further received low priority requests are queued in round robin arbiter one 103 and the arbitrated suggested grant vector remains the same. Thus if the requests associated with channel two are empty in round robin arbiter one 103, and arbitration evaluates channel two, finds it empty, round robin arbiter one 103 moves to and selects the requests from channel three. The channel three requests become the grant vector. If high priority requests are subsequently granted by multiplexor 105, but no low priority request is granted, round robin arbiter one 103 holds the request from channel three as the suggested grant vector. This suggested grant vector remains intact even if a request arrives from channel two which had been passed over to select the channel three request vector. This design avoids rearbitration.

In operation, completion of a request by the multiplexor 105 generates a request_done indication. The request_done indication is combined with the low priority bank grant signal and if both are true according to AND element 106, round robin arbiter one 103 rearbitrates its request vectors and determines a new suggested grant vector. This AND function differs from round robin arbiter zero 102, which rearbitrates every frame, and is optional depending on desired system performance. The system further includes clock and reset signals as shown in FIG. 1.

Alternate aspects of the present invention include using more than two arbiters for more than two levels of priority, using a different number of channels and prioritizing by incoming channel, and rearbitrating suggested grant vectors every frame.

Figure 2:
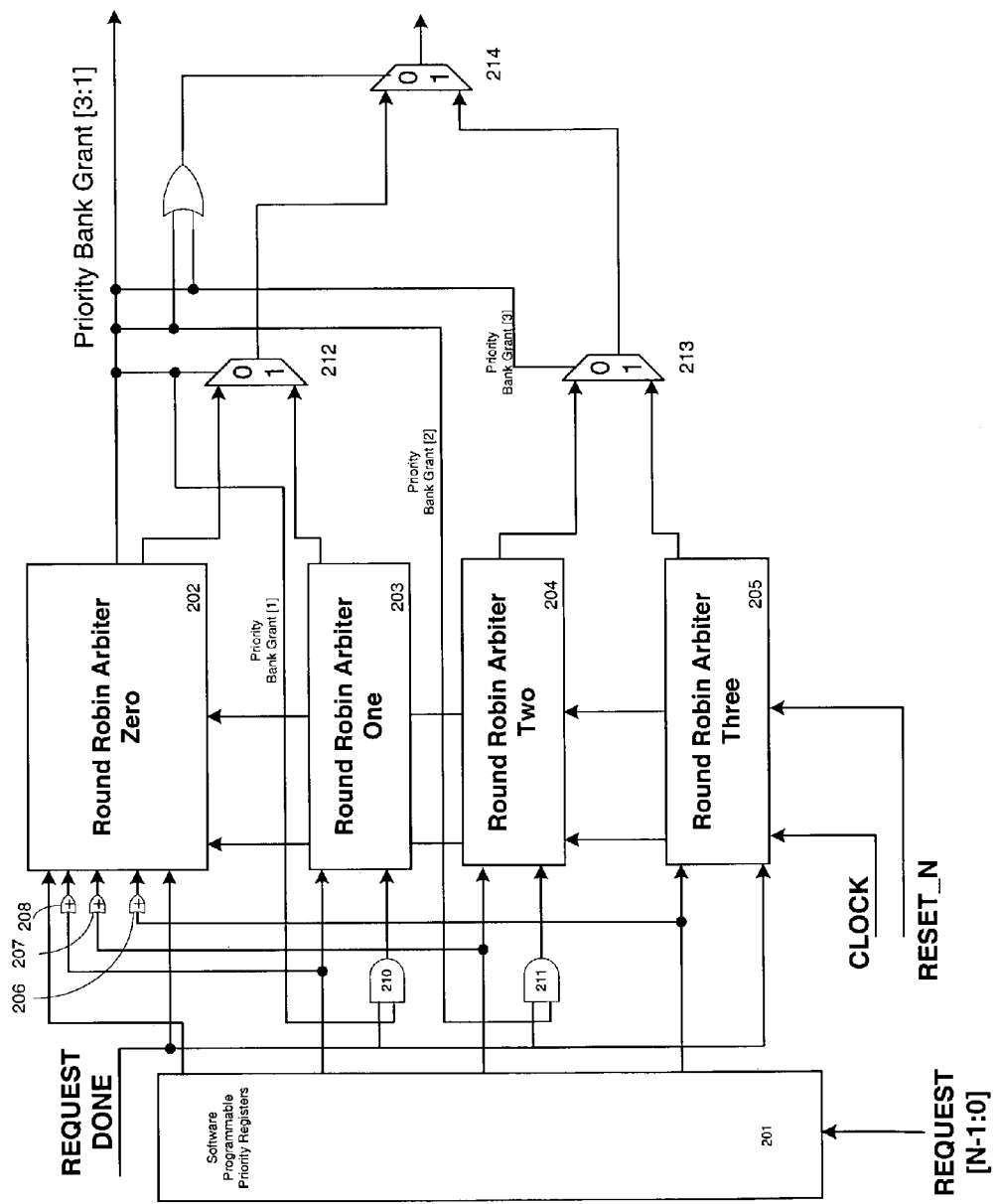
FIG. 2 illustrates a cascaded round robin arbitration design employing four arbiters and allowing four levels of priority.

With respect to multiple levels of priority and multiple round robin arbiters, FIG. 2 illustrates such an implementation. FIG. 2 illustrates four round robin arbiters, each having an assigned level of priority 0–3, with 0 being highest and 3 being lowest. In the implementation of FIG. 2, software programmable priority registers 201 operate to receive incoming requests and assign requests based on priority accorded, such as by assigning certain channels priority 0, other channels priority 1, and so forth, or alternately receiving requests with an associated priority 0 through 3. Software programmable round robin arbiter zero 202 receives the high priority request vector having dimension 1 by N. In this arrangement, of the N available slots, one is taken by round robin arbiter three 205 (priority 3), three slots by round robin arbiter two 204 (priority 2), six slots by round robin arbiter one 203 (priority 1), and N−10 slots by round robin arbiter zero (priority 0). Each of the other request vectors for priorities 1, 2, and 3 pass through individual OR gates 206, 207, and 208, which OR the contents of each respective vector to determine the presence of values in the respective priority queue.

Request vectors are provided to round robin arbiter three 205, round robin arbiter two 204, and round robin arbiter one 203 by the software programmable priority registers. In the arrangement shown, round robin arbiter two 204 and round robin arbiter one 203 reprioritize selections after each priority grant, or grant of a vector, while round robin arbiter three 205 does not reprioritize after each grant using AND gates 210 and 211. AND gates 210 and 211 require the presence of a request done and a priority 3 bank grant to rearbitrate based on then existing requests in the request vector. Clocking and resets are provided to each of the four arbiters shown.

Three multiplexers are employed to grant the appropriate candidate vector based on the round robin circumstances. Different schemes may be employed to grant vectors, such as granting all priority zero slots, followed by granting all six priority one slots, followed by granting all three priority two slots, and finally granting the one priority one slot. However, it may be more advantageous to grant in a varied ordering, such as granting a certain number of priority zero slots, followed by one priority one slot, followed by more priority zero slots, followed by a priority two slot, followed by more priority zero slots, followed by a priority one slot, followed by more priority zero slots, followed by a priority three slot, and so forth. In this manner, grant vectors occur in a more random fashion and requests of the various priorities do not have to wait for an extended period of time for access to the resource. Other schemes may be employed and programmed accordingly.

In the arrangement shown in FIG. 2, priority one, two, and three bank grants are computed and issued by round robin arbiter zero 202. In the event of a priority one slot being selected, priority one bank grant signal is set true, the grant vector issued is the priority one grant vector. No other priority bank grants can issue, so multiplexor 212 enables the priority one vector to pass, while multiplexors 213 and 214 allow the priority one vector to pass through to the resource. Multiplexor 213 is a "don't care" value for this example, and can be set to either the higher priority or lower priority queue. Alternately, if a priority two slot is selected, priority two bank grant signal is set true, and multiplexor 212 selects grant vector zero by default. Multiplexor 213 decides between grant vector two and grant vector three, and with priority bank grant two high, grants the priority two vector. Multiplexor 214 enables the priority two vector to pass. In the event of a priority three grant, priority three bank grant signal is set true while priority one and priority two bank grants are set false. Multiplexor 212 selects grant vector zero by default. Multiplexor 213 decides between grant vector two and grant vector three, and with priority bank grant two low, grants the priority three vector. Multiplexor 214 receives the priority three bank grant signal and chooses priority three over the priority zero grant. Other multiplexor arrangements or grant decision mechanisms may be employed, as long as an adequate number of grants are made to each priority level in a round robin or relatively round robin manner.

Hardware implementation.

Figure 3A:
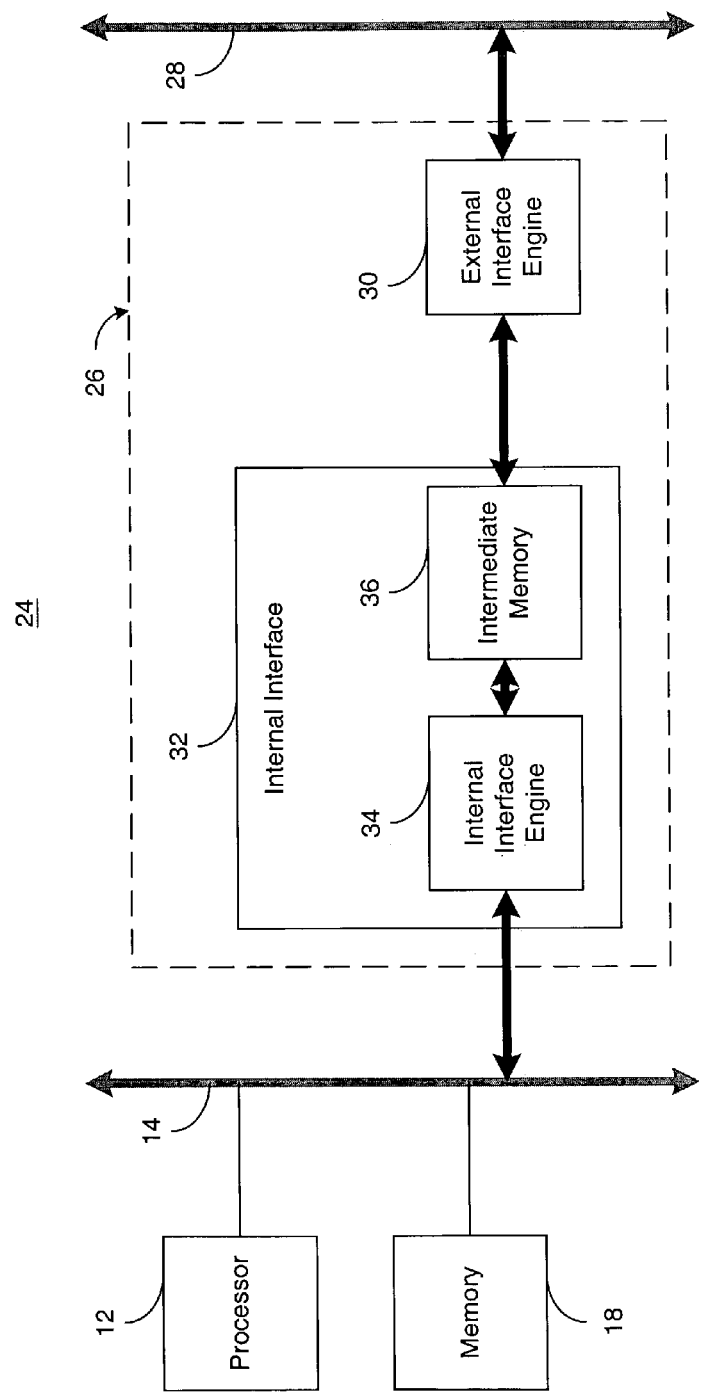
FIG. 3A shows a block diagram of an example of a networking architecture.

FIG. 3A shows a networking architecture 24 having a network interface 26 disposed between a processor internal bus 14 and an external bus architecture 28 having one or more external buses. One or more networking processors 12 and an internal memory 18 are coupled to the internal bus 14. The term "coupled" is used herein to indicate either direct or indirect connection, and may be implemented by any commercially available technique, be it electrical, optical, magnetic, mechanical, or any combination thereof. The external bus architecture 28 is capable of supporting a number of bus protocols such as the peripheral component interconnect (PCI) protocol and the Utopia Level 2 family of protocols. While the network interface 26 will be primarily discussed with regard to the PCI and Utopia protocols, it should be noted that the invention is not so limited. Indeed, the network interface 26 is useful in any networking architecture in which network performance is an issue of concern. Notwithstanding, there are a number of aspects of these protocols for which the network interface 26 is uniquely suited.

It can generally be seen that the network interface 26 has an external interface engine (EIE) 30 and an internal interface 32. Only a portion of the network interface 26 has to change in order to accommodate new protocols. Specifically, new interfaces can be readily added by adding EIEs 30. The EIE 30 is coupled to the external bus 28, where the EIE 30 communicates over the external bus architecture 28 in accordance with one or more bus protocols. The internal interface 32 is coupled to the EIE 30 and the internal bus 14, where the internal interface 32 buffers network data between the internal bus 14 and the external bus architecture 28. By buffering network data, a number of benefits can be achieved. For example, internal data transport can be isolated from transient network bursts/dry spells in order to decouple internal transport latencies from external transport latencies. Furthermore, there are certain economies of scale that favor the aggregation of packets in the network data. A number of other benefits are also achieved as will be discussed herein.

More particularly, it can be seen that the internal interface 32 has an internal interface engine (IIE) 34 coupled to the internal bus 14, where the IIE 34 defines a plurality of queues for the network data. An intermediate memory module 36 is coupled to the IIE 34 and the EIE 30, where the memory module 36 aggregates the network data in accordance with the plurality of queues. The data from separate queues is segregated in independent buffers in the intermediate memory module 36.

Figure 3B:
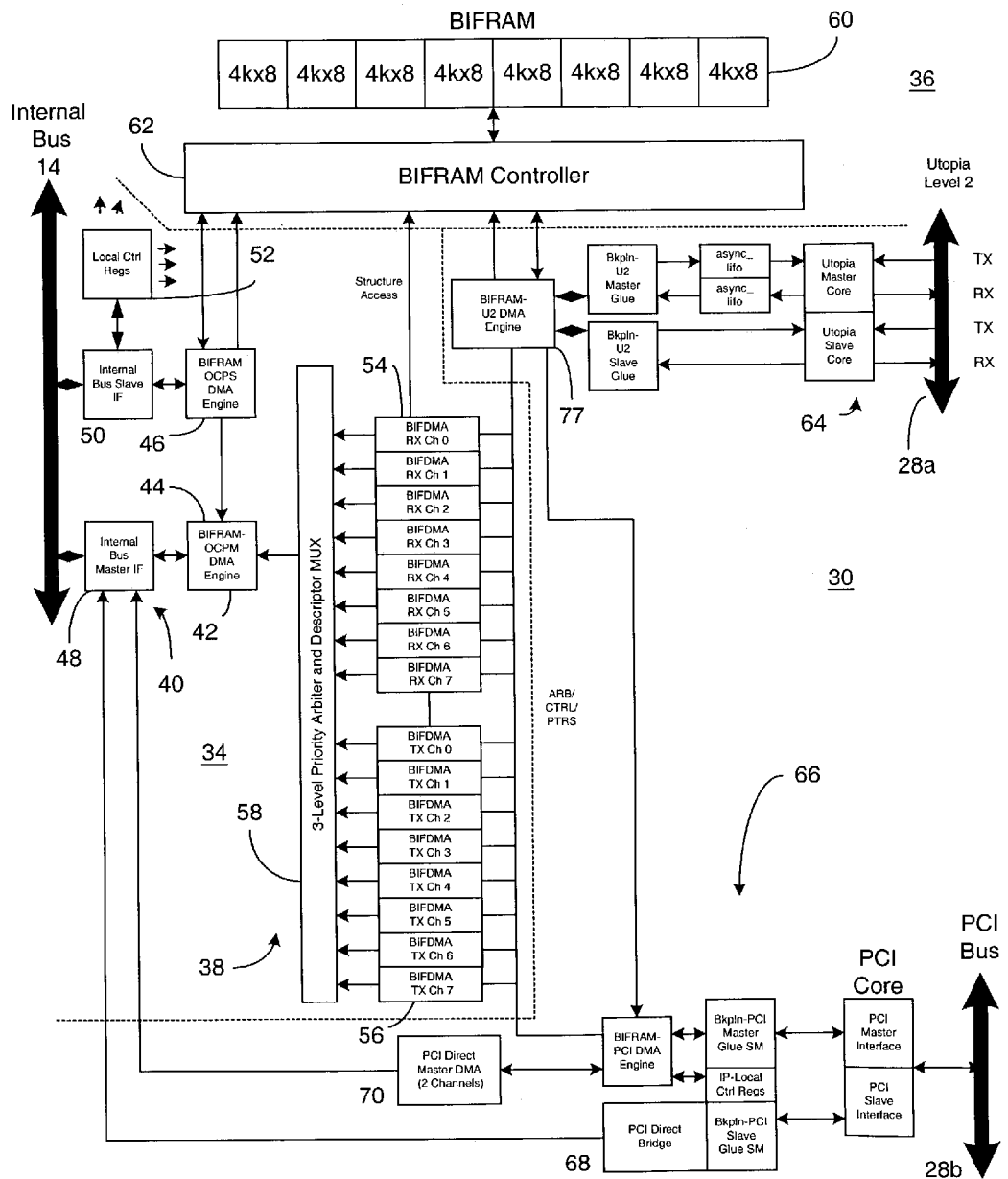
FIG. 3B is a block diagram of an example of a network interface including a three level priority arbiter.

From FIG. 3B, the IIE 34 generally includes a multi-channel register structure 38 coupled to the EIE 30 and the intermediate memory module 36. An internal bus interface architecture 40 is coupled to the internal bus 14. A direct memory access (DMA) engine architecture 42 is coupled to the internal bus interface architecture 40 and the intermediate memory module 36. The DMA engine architecture 42 enables the internal bus interface architecture 40 to transport the network data directly between the intermediate memory module 36 and a plurality of addressable locations via the internal bus 14. In particular, the interface architecture 40 is able to send data to, and receive data from the processor in addition to the internal memory.

Thus, network data is written to the intermediate memory module 36, and then written to either the internal bus 14 (if incoming) or to the external bus architecture 28 (if outgoing). The resulting data transport scheme can therefore be viewed as a "write-write" scheme as opposed to the more traditional "read-write" scheme in which data is written to the destination memory, and read by the processor in question.

The DMA engine architecture 42 includes a master DMA engine 44 and a slave DMA engine 46. The master DMA engine 44 uses queue priority data from the register structure 38 to determine DMA setup information, such as source and destination address, direction, and DMA length, for the queues as they win priority. The master DMA engine 44 therefore determines which queue will be mastering the internal bus 14 and implements the direct memory access. The slave DMA engine 46, on the other hand, effectively allows the internal bus 14 to master the data transfer. Thus, the selected queue is a function of the encoding of the slave address, and is not determined by the arbitration taking place in the register structure 38. The internal and external engines can be independently configured to be masters/slaves on the receive and transmit paths. For example, on data transmit from the device, the internal engine can be a slave and the external can be a master. The same is true for receiving data.

It can further be seen that the internal bus interface architecture 40 includes an internal bus master interface 48, an internal bus slave interface 50, and a plurality of local control registers 52 coupled to the internal bus slave interface 50. The local control registers 52 store data regarding the plurality of addressable locations and other handoff information.

In addition, the multi-channel register structure 38 has a set of receive queue registers 54 coupled to the EIE 30 and the memory module 36. A set of transmit queue registers 56 are coupled to the EIE 30 and the memory module 36, and control logic 58 is coupled to the receive queue registers 54 and the transmit queue registers 56 to prioritize the queues and define DMA setup information for the network data. Thus, the control logic 58 arbitrates among the queues and multiplexes the results as priorities are assigned.

The memory module 36 includes a random access memory (RAM) 60 and a RAM controller 62 coupled to the RAM 60, the EIE 30 and the IIE 34. The RAM controller 62 establishes buffer partitions based on the queues defined by the IIE 34. The buffer partitions are variable based on throughput requirements of the network data. By providing configurable partitions, a number of benefits can be obtained. For example, different classes of traffic can be transported and processed according to their distinct needs. This approach also enables the programmer to trade off processing/transport efficiency and data transport latency independently for different types of traffic. Furthermore, the DMA independent handoff mechanism enables several packets to be processed simultaneously in the packet core and the amortization of data transport costs.

It can further be seen that the EIE 30 includes a first external bus interface 64 and a second external bus interface 66. The first external bus interface 64 communicates over a first external bus 28a in accordance with a first bus protocol. In the illustrated example, the first bus protocol is the Utopia Level 2 protocol. The second external bus interface communicates over a second external bus 28b in accordance with a second bus protocol. In the illustrated example, the second bus protocol is the PCI bus protocol.

The second external bus interface 66 has a direct link with the internal bus master interface 48 in order to use the second external bus interface 66 as a host interface. In other words, the second external bus interface 66 interfaces to a host central processing unit (CPU), which configures and initializes the system and may perform call setup. In the direct bridge 68 the host CPU directly accesses the internal bus 14. In this mode, the direct bridge 68 acts as a slave on the external bus architecture 28 and a master on the internal bus 14. The direct master DMA 70 is a DMA engine, which copies data from the internal bus 14 to the external bus architecture 28, or vice versa, and acts as a master on both buses.

The buffer-based structure enables a batch-compute model within the processor 12, and permits a tradeoff of data transport/processing efficiency against compute latency. The buffer-based structure also permits higher utilization of SOC resources. The multiple queue structure permits different classes of traffic to be handled differently. Furthermore, different classes of traffic can be directed to different locations in the SOC. The multiple queue structure also allows the user to dedicate other SOC resources, such as processor cores, to given queues (with potentially different functions), providing higher efficiency and/or simpler software design. The multi-buffer structure enables multiple buffers of data to be processed simultaneously within the core. It will further be appreciated that the data can be handed-off to any agent at any addressable location. Thus, a single queue structure can be used for multiple categories of traffic, such as control traffic, data traffic and through traffic. The support for framing of data provides the software at the destination end of the transfer with knowledge of the framed boundaries, so that it does not have to parse framed contents to determine these boundaries. The result is a significant savings of compute time. It will be appreciated that across queues, data transport priority can be altered in several ways. The flexible allocation of resources, such as allowing software to configure different sized RAM partitions as well as varying DMA block size and DMA latencies for different queues, can help the user meet strict latency or bandwidth requirements of higher priority channels.

It will further be appreciated that the architecture of the network interface 26 enables interfaces from multiple protocols to be seamlessly supported. The external network may be a standard electrical bus such as a PCI bus. Utopia (Level 1, 2 or 3), POS/PHY, etc. or it may be a proprietary bus. Through multiple external bus interfaces 64, 66, a single network interface (or backplane interface, BIF) implementation may interface to multiple different and independent physical busses. Furthermore, to cope with the varying data ordering mechanisms present in different protocols, each queue is equipped with an independent byte-swapping mechanism.

Typically, the peak throughput of an interface such as the Utopia or PCI interfaces is significantly higher than the average rate at which data is processed inside the SOC. Conversely, there may be periods following traffic bursts during which the network runs "dry". To address this need, the RAM 60 allows the SOC to absorb bursts of data from the network. The data might otherwise be lost. The network interface 26 has a multi-layer mechanism to tolerate errant network traffic characteristics. The RAM 60 acts as a buffer that isolates internal transport latencies from external transport latencies. Short network transients can be absorbed by the RAM 60. The IIE 34 has a hardware-based overflow tolerance mechanism that enables it to buffer data when the SOC experiences a temporary burst of traffic on a network interface on receive, or when the network is congested on transmit. The hardware-based overflow is specified with a state-machine mechanism that is straightforward to implement. Data that overflows is presented with the same look and feel, i.e., in the same buffers to the same locations as the original data. Therefore, the internal software architecture does not need a separate processing flow for overflow data. Conversely, during dry spells, a hardware preempt feature ensures that there is no stale data in the RAM 60. If both these mechanisms fail, for data receive there is a hardware backpressure signal that can be raised across the network interface 26 through the EIE 30. In this case, on transmit the SOC will stall, and on receive the network will stall.

As already discussed, each of the data queues have an independent register set. However, the eight queues share the RAM 60 and transport resources. The partitioning of the resources, across the eight queues, is programmable. These queues may be assigned to different external interfaces and/or to different internal processor cores within the SOC. Resource allocation is flexible between the queues because different queues may be assigned varying partition sizes in the RAM 60, and varying priorities may be assigned to the DMA transfers performed by the IIE 34 or EIE 30. The duration for which the shared resources are occupied when they are acquired is also individually programmable.

An SOC with the network interface 26 can robustly tolerate network misbehavior and preserve data that might otherwise be lost. The RAM 60 also decouples the latencies of the internal and external bus interfaces. Periods of bursty traffic from the network, temporary network congestion or network dry spells are isolated from the internals of the SOC. The multi-layered data transport architecture minimizes the number of occasions at which the interface will prevent the external network from transferring data and the number of times the SOC stalls in response to network conditions. The network interface 26 allows multiple physical interfaces (such as PCI and Utopia) to present a common electrical and programming interface to internal hardware/software of the SOC. This common interface reduces design time and enables higher design abstraction for both the hardware blocks and the software programs internal to the SOC, compared with other architectures where internal hardware and software interfaces directly to different external buses. New network interfaces can be added without altering the internal architecture of the SOC and with minimal disruption to the internal architecture and design. The resources of the network interface 26, and as such the resources of the entire SOC, can be seamlessly shared across the multiple external protocol interfaces in a variety of configurations.

Figure 4:
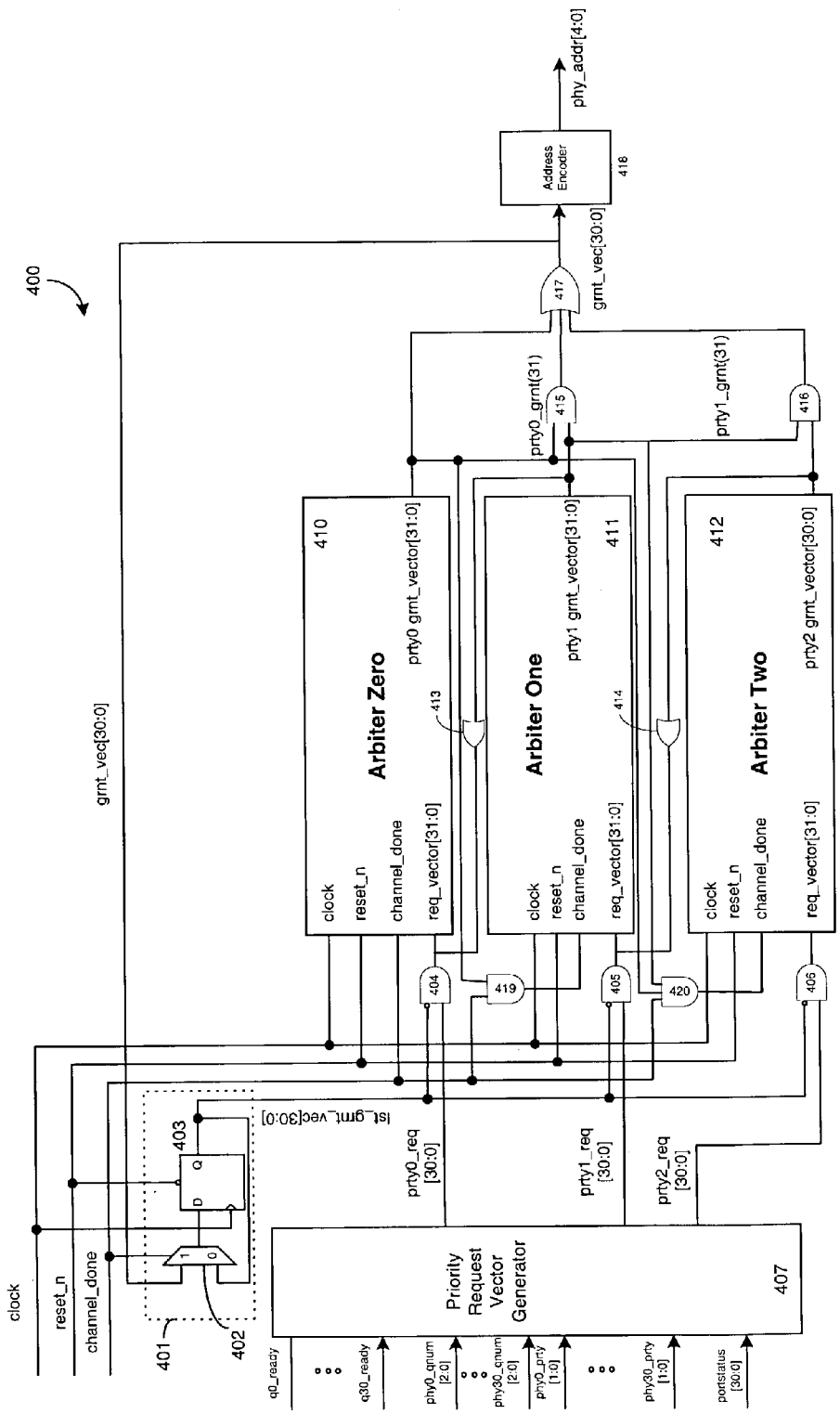
FIG. 4 is a hardware diagram of a design implementing a three level priority PHY selection design for use in a Utopia master mode interface.

With respect to the BIFRAM-U2 DMA Engine 77, an example of the logic is presented in FIG. 4. In a general Utopia master interface, the master needs to poll all of the PHYs (physical layers) to make a selection. In the design illustrated in FIG. 3B, frames are transferred from approximately eight or more different processing queues within the master. Each PHY is associated with a different queue or resource. Frames associated with certain queues or PHY addresses sometimes must be processed more rapidly, such as in the case of management Asynchronous Transfer Mode (ATM) frames.

The design illustrated in FIG. 4 provides configurable priority levels for all of the PHYs, and enables multiple levels of priority for any PHY. While three levels are shown in FIG. 4, any number of levels can be implemented. Multiple resources or queues can be destinations. FIG. 4 illustrates eight queues, but again any number of queues can be employed. The master may select from among any number of PHYs. Presently Utopia allows up to 31 PHYs, but more can be implemented using the present concepts.

Hardware implementation or system 400 includes arbiter zero 410, arbiter one 411, and arbiter two 412. Clock, reset, and channel done signals are fed to optional flip flop circuitry 401, including multiplexor 402 and flip flop 403. These signals are inverted and feed AND gates 404, 405, and 406 with the last granted vector received. If the channel done signal is true, the clock timing is correct, and the signal has not been reset, the last granted vector is the channel that has most recently completed a transaction. This vector is transmitted from the flip flop 403 and the optional flip flop circuitry 401.

Priority request vector generator 407 receives the various signals shown. Signals received by the priority request vector generator 407 include q0_ready through q7_ready, indicating whether queues zero through 7 have data ready for transfer. If a queue is empty, the signal will be low and data will not be transmitted from the queue. Phy0_qnum through Phy30_qnum represents which queue is associated with PHY 0 through which queue is associated with PHY 30. For example, PHY 0 may be associated with queue 1, PHY 1 with queue 2, PHY 3 with queue 1, and so forth. Each PHY is associated with one queue. In the configuration shown, eight queues and 31 PHYs are allocated, but other values could be employed. Phy0_priority through Phy30_priority are the priorities associated with the specific physical layer—PHY 0 may be low priority, PHY 1 high priority, PHY 2 medium priority, and so on. Port status is a 31 bit signal with a high value if the particular PHY is ready to transfer data. The priority request vector generator 407 determines the arbitration level, high medium, or low in this configuration, based on the programmed priority of each requester. The priority request vector generator 407 also determines the status (true or false) of each request from each requestor depending on whether each PHY is ready and the associated queue is ready.

The present system and the design of FIG. 4 contemplates possible two way transfer of Utopia cells, or network traffic having similar polling protocols, namely transmitting cells from the queue to the PHY or alternately receiving cells at the queue from the PHY. In the design shown, the priority request vector generator asserts the request for the PHY to the arbiters, but the manner in which the assertion occurs depends on whether data goes from the queue to the PHY or vice versa.

The priority request vector generator 407 either determines whether to transmit from the queue to the PHY or whether to receive from the PHY to the queue. If transmitting from the queue to a PHY, for each queue numbered 0 to 7, priority request vector generator 407 determines whether the queue has a valid cell to transmit. If so, for each PHY from 0 to 30, the priority request vector generator 407 evaluates whether the cell in the queue is destined for the particular PHY, and whether the port status is valid such that the PHY can accept data. If both these conditions are true, for each priority level low, medium, and high, if a PHY is assigned to the priority level, the request for the PHY is asserted to or passed from the PHY to the arbiter associated with the priority level.

Alternately, if the priority request vector generator 407 is to receive from the PHY to the queue, for each queue from queue 0 to queue 7, if the queue can accept a cell, for each PHY from PHY 0 to PHY 30, the priority request vector generator 407 determines whether the queue in question is associated with the particular PHY and whether the port status is valid such that the PHY has a cell to send. If both these conditions are true, for each priority level (low, medium, or high in this configuration), if the PHY is assigned to the particular priority level, the priority request vector generator 407 asserts the request for this PHY to the arbiter (410, 411, or 412) for this priority level.

Thus according to the foregoing logic, the resultant 31 element request vector is either transmitted to arbiter zero 410, arbiter one 411, or arbiter two 412. The request vector is assembled with all other request vectors for a particular priority level in each arbiter and the grant of the vector is performed in a similar manner to that described above.

Arbiter zero 410 receives the clock signal, reset signal channel done signal, and the request vector transmitted from priority request vector generator 407 for high priority requests. The request vector in this aspect is a 32 element request vector. The request vector received at arbiter zero 410 is comprised of the 31 element priority vector transmitted from priority request vector generator 407 combined with the inverse of the last grant vector received from flip flop 403 within optional flip flop circuitry 401. This combination occurs at AND gate 404.

The purpose of the optional flip flop circuitry 401 and the combination at AND gate 404 is to prevent transmitting request vectors to the same PHY two times in a succession. Thus combining the present request from the priority request vector generator 407 for the three priority levels with the inverse of the last granted vector at the three AND gates 404, 405, and 406 removes the last PHY as a candidate at the arbiter. The resultant vector includes a high indication, or 1, if the PHY is available for transfer.

The resultant 31 element vector from AND gate 404 is combined with an ORed version of the grant vector from arbiter one 411. The presence of this OR gate 413 and the OR gate 414 is optional, and can be employed in certain circumstances to improve performance. The general presence of the suggested grant vector feeding from the lower level, say arbiter two 412 and the low priority suggested grant vector, to the higher level, such as arbiter one 411, is to provide an indication from the lower level to the higher level that the lower level contains a suggested grant vector and should be considered in arbitration. The OR gate, such as OR gate 414, combines all elements of the lower level suggested grant vector to create a most significant bit indicating the presence of data in the lower level suggested grant vector. The presence of these signals from OR gate 413 and 414 may also improve certain conditions, such as boundary conditions resulting from timing when requests are active, or to improve critical path timing, such as when one arbiter transmission rather than the other produces better performance. Again, the OR gates 413 and 414 and paths associated therewith may be omitted, and the AND gates 404, 405, and 406 may also be omitted depending on circumstances and desired performance. If the AND gates 404, 405, and 406 and the optional flip flop circuitry 401 are omitted, the priority requests pass directly from priority request vector generator 407 to the arbiters 401, 402, and 403. These may be combined with the results from OR gates 413 and 414 if desired.

The arbiters 410, 411, and 412 receive the information and operate in accordance with the previous discussion. In particular, arbiter zero 410 grants and outputs only one suggested grant vector at a time in round robin fashion. For example, if high priority PHYs are 0 through 9, all requests received from these ten PHYs are stored in arbiter zero 410 and held until granted. Arbiter zero 410 selects a PHY, or winning request, if the request vector includes nonzero bits, and selects the winner in round robin fashion. If the request from PHY 0 is active, and if the arbiter determines that PHY 0 is the next channel in sequence, the request from PHY 0 is granted. The resulting grant vector passes from arbiter zero 410 and on to OR gate 417 and address encoder 418. Arbiter zero 410 holds the grant vector until it receives the channel_done signal, which means the current transfer is complete. Once this occurs, arbiter zero 410 will perform another round of arbitration if the request vector still contains nonzero bits.

In the present aspect of the design, arbiter zero 410 has available and may transmit a priority grant vector every frame. Arbiter one 411 and arbiter two 412 operate in a similar manner. In this aspect, the system uses a set of AND and OR operators 415, 416, 417, 419 and 420 and logic to determine which vector is ultimately granted. After arbiter zero 410 has serviced each requesting PHY of the highest priority, arbiter zero 410 will allocate one arbitration slot in this aspect to the medium priority level. Likewise, after arbiter one 411 has serviced each request on the medium priority level, it allocates one slot to the lowest priority level. This implementation ensures no requesting PHY or processing queue is locked out indefinitely.

AND gate 419 receives a channel done signal and the most significant bit (MSB) of the grant vector produced by arbiter zero 410 and combines them. When both signals are high, this activates the channel_done input of arbiter one 411 indicating that the request currently being granted by arbiter one 411 has completed. Upon receipt of the indication that the request granted by arbiter one 411 has completed, arbiter one 411 rearbitrates to determine the next value of the medium level grant vector of size 32.

AND gate 420 receives a channel done signal and the MSBs of both priority zero (high) and priority one (medium) grant vectors from the other two arbiters. When all are true, arbiter two receives the full true signal in its channel_done input and rearbitrates to determine the next value of the 31 element low priority grant vector in response.

From arbiter zero 410, bits 30:0 of the high priority grant vector pass to OR gate 417, and the MSB (bit 31) of the high priority grant vector passes to AND gate 420 and AND gate 419. The MSB of the high priority grant vector also passes to AND gate 415, where it is combined with bits 30:0 of the grant vector from arbiter one 411. The purpose of AND gate 415 and AND gate 416 is to ensure that the priority of the grants is properly daisy chained and that the final output vector of OR gate 417 contains the grant for the proper granted channel, regardless of its priority level. AND gate 415 uses the MSB of arbiter zero 410 (high priority) grant vector to enable arbiter one 411 (medium priority) vector. The ANDed vector passes to OR gate 417. AND gate 416 uses the MSB of arbiter one 411 (medium priority) grant vector to enable arbiter two 412 (low priority) vector. The low priority vector from arbiter two 412 is 31 elements in size. The ANDed vector passes to OR gate 417.

OR gate 417 determines which vector is granted. Under typical circumstances, the bulk of arbiter zero results are passed, as long as they are not passing to the same PHY twice in a row. The number of lower priority requests that pass and the order of such is controlled by controlling AND gates 415 and 416. For example, as noted above, 70 high priority requests may pass, 25 medium priority requests may pass, and five low priority requests may pass for every one hundred requests granted. All 70 high priority requests may be granted in succession, followed by all 25 medium priority in succession, followed by all five low priority in succession, or they may be interspersed. Different numbers of grants associated with the priorities may be employed, and more or less than three priority levels and arbiters may be used in accordance with this invention. If the results of AND gate 415 and AND gate 416 include values, and the priority grant vector from arbiter zero 410 is received, the result may be granting priority to a desired level request according to a scheme, such as a lookup table.

Alternately, the arbiters may determine the presence of grant vectors at lower levels and transmit grant vectors according to a scheme implemented in or associated with the arbiters themselves. In this manner, OR gates 413 and 414 may be employed to determine the presence of lower priority grant requests, and arbiter zero 410 could delay a high priority grant transfer if the round robin arbitration dictates a medium or low priority grant is warranted. Thus the illustrated design provides a level of control flexibility depending on the desired system performance.

The net result of the OR gate 417 is the 31 element grant vector, transmitted to Address Encoder 418, which correlates the grant vector elements with a PHY address, using a look up table or any desired encoding algorithm. The physical address in this aspect is a five bit value and the five bit value is transmitted and through the hardware to enable access to the associated PHY.

In operation, the configuration registers (not shown) specify the priority level for each PHY, as well as defining the associated queue for each PHY. A register (also not shown) can hold the frame status for each PHY. When the PHY has a frame to transfer, the polling engine of the Utopia Master module, for example, may set the corresponding bit in the frame status register. A queue valid signal may be generated to indicate whether the queue is ready to transfer a frame. A request vector is generated for each defined priority level. Each bit in the vector can be set according to the PHY transfer status, priority, associated queue and queue validity information. Each bit in the grant vector or request vector represents one PHY requesting to transfer one frame. The bit index may correspond to the PHY address, i.e. bit zero to PHY zero, bit 30 to PHY 30, and so forth. The round robin arbiters 410, 411, and 412 generate grant vectors for each priority level according to the request vector for that priority level. The system may employ a barrel shifter and a priority encoder to implement the arbiter, but generally any combination of hardware, software, firmware, and/or other devices or methods known to those skilled in the art may suffice so long as the functionality described herein may be achieved.

Each arbiter, or the highest priority arbiter, selects a grant vector if the request vector for either the highest available or a predetermined priority level has any non-zero bits. Each arbiter maintains its grant vector until such time as the channel_done signal is received, indicating completion of the current vector transfer. Further rounds of arbitration may occur if the request vector still contains nonzero bits.

The daisy chain or cascaded linking of round robin arbiters 410, 411, and 412 provides for arbitration between priority levels, where arbiters zero and one arbitrate between 32 requests, while arbiter two 412 arbitrates between 31 requests. When the request vector for either arbiter two 412 or arbiter one 411 has nonzero bits indicating that at least one PHY of the low or medium priority has a frame to transfer, the arbiter will set the most significant bit of the request vector for the next higher level arbiter. In this arrangement, after arbiter zero 410 has serviced the requesting PHY of the highest priority, it can allocate one slot to the medium priority level. After arbiter one 411 has serviced each request of the medium priority level, it will allocate one slot to the lowest priority level in the arrangement shown in FIG. 4. The result is use of the encoded address to select the PHY for the Utopia or other interface type transfer, as well as the queue number for the transfer.

It will be appreciated to those of skill in the art that the present design may be applied to other systems that perform arbitration, and is not restricted to the arbitration structures and processes described herein. Further, while specific queues, channels, requesters, levels of priority, and resources or PHYs have been discussed herein, it is to be understood that more or less of each may be employed while still within the scope of the present invention. Accordingly, any and all modifications, variations, or equivalent arrangements which may occur to those skilled in the art, should be considered to be within the scope of the present invention as defined in the appended claims.

What is claimed is:

1. A system for controlling access to a plurality of resources based on at least one individual request received from at least one requestor seeking access to said resources, comprising:
   a priority register configured to receive each individual request and determine a priority for said request and transmit said request to a priority appropriate path;
   a first high priority arbiter receiving and arbitrating among highest priority requests in a round robin manner to determine a high priority suggested grant vector, wherein a predetermined quantity of request vector slots are allocated to lower priority requests, said first higher priority arbiter having an ability to generate a lower priority indication;
   a second lower priority arbiter receiving and arbitrating among lower priority requests in a round robin manner to determine a lower priority suggested grant vector; and
   grant circuitry connected to said first high priority arbiter and said second lower priority arbiter, said grant circuitry configured to receive high priority suggested grant vectors and lower priority suggested grant vectors and configured to pass the high priority suggested grant vector unless said grant circuitry receives the lower priority indication from the first higher priority arbiter, whereby the grant circuitry passes the lower priority suggested grant vector.

2. The system of claim 1, wherein said grant circuitry comprises a multiplexor capable of receiving the low priority indication and passing the high priority suggested grant vector unless the low priority indication has been received.

3. The system of claim 1, wherein priority in the priority register is determined by receiving a priority along with the individual request, and further wherein each high priority individual request is transmitted to the first high priority arbiter and each lower priority individual request is transmitted to the second lower priority arbiter.

4. The system of claim 1, wherein priority in the priority register is determined according to a priority level accorded the requester, and further wherein each high priority individual request is transmitted to the first high priority arbiter and each lower priority individual request is transmitted to the second lower priority arbiter.

5. The system of claim 1, further comprising an OR gate, wherein the OR gate receives lower priority requests and passes an OR function of the lower priority requests to the first high priority arbiter as an indication lower priority requests are available.

6. The system of claim 5, wherein the first high priority arbiter provides at least one round robin slot for at least one low priority request when the OR gate indicates low priority requests are available.

7. The system of claim 1, wherein the second lower priority arbiter comprises a series of lower priority vector slots and one lower priority request vector slot is allocated.

8. The system of claim 1, further comprising a third low priority arbiter receiving and arbitrating among low priority requests in a round robin manner to determine a low priority suggested grant vector.

9. The system of claim 8, wherein the low priority indication indicates whether a lower priority suggested grant vector or a low priority suggested grant vector is warranted.

10. The system of claim 1, wherein once the grant circuitry passes one from the group including the lower priority grant vector and the high priority grant vector, the second lower priority arbiter rearbitrates all received lower priority requests.

11. A method for arbitrating between different priority requests for access to resources, comprising:
    separating requests into priority groups;
    arbitrating among the highest priority requests and lower priority requests using a high priority arbiter including:
        granting a first selected number of grant requests to requests having highest priority using grant circuitry connected to the high priority arbiter and configured to receive highest priority requests and lower priority requests when highest priority requests are indicated from said high priority arbiter to said grant circuitry, and
        granting a second selected number of grant requests having lower priority only when lower priority requests are indicated from said high priority arbiter to said grant circuitry,
        wherein said high priority arbiter operates in a round robin manner.

12. The method of claim 11, wherein said arbitrating is performed by a plurality of arbiters that arbitrate among incoming requests and determine candidate grant vectors.

13. The method of claim 12, wherein said arbitrating further comprises the highest priority arbitrator providing an indication when in the round robin manner a highest priority request is unwarranted, enabling granting a lower priority request.

14. The method of claim 11, wherein said priority groups comprise a highest priority group and at least one lower priority group.

15. The method of claim 11, further comprising rearbitrating lower priority requests after granting a grant request.

16. The method of claim 12, wherein separating requests comprises determining a priority associated with each request and passing high priority requests to a first arbiter and each lower level of priority request to an arbiter associated with that lower level of priority.

17. An apparatus for controlling access to a plurality of resources based on at least one individual request seeking access to said resources, comprising:
    means for receiving each individual request, determining a priority for said request, and transmitting said request to a priority appropriate path;
    high priority arbitrating means for receiving and arbitrating among highest priority requests in a round robin manner to determine a high priority suggested grant vector;
    lower priority arbitrating means for receiving and arbitrating among lower priority requests in a round robin manner to determine a lower priority suggested grant vector; and
    grant means connected to said high priority arbitrating means and said lower priority arbitrating means, said grant means configured to receive at least one high priority suggested grant vector and at least one lower priority suggested grant vector and configured to pass the high priority suggested grant vector under a first set of circumstances and said lower priority suggested grant vector when an indication is presented from the high priority arbitrating means to the grant means that at least one lower priority request may be granted.

18. The apparatus of claim 17, wherein said high priority arbitrating means generates a lower priority indication to the grant means in predetermined circumstances.

19. The apparatus of claim 18, wherein the predetermined circumstances comprise a low priority position in a round robin sequence.

20. The apparatus of claim 18, wherein the grant means passes the lower priority grant vector once the grant means has received the low priority indication.

* * * * *